(No Model.)
M. GRISWOLD & O. R. HANCHETT.
STOVE PIPE DAMPER.
No. 405,408. Patented June 18, 1889.
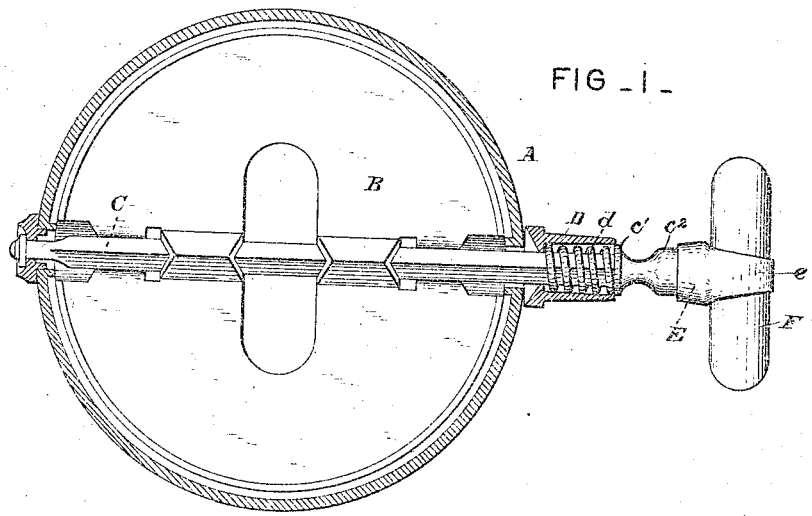
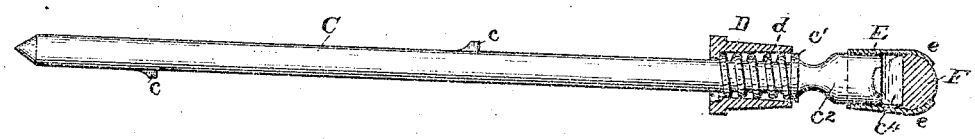
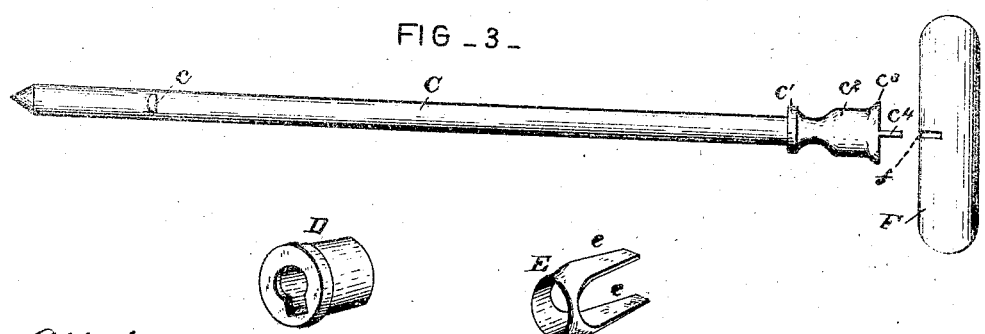
Attest:
Geo. T. Smallwood,
Jas. K. McCathran
Inventors:
Matthew Griswold,
Oren R. Hanchett,
By A. M. Smith & Son,
Attorneys

UNITED STATES PATENT OFFICE.

MATTHEW GRISWOLD AND OREN R. HANCHETT, OF ERIE, PENNSYLVANIA; SAID HANCHETT ASSIGNOR TO SAID GRISWOLD.

STOVE-PIPE DAMPER.

SPECIFICATION forming part of Letters Patent No. 405,408, dated June 18, 1889.

Application filed January 29, 1889. Serial No. 297,914. (No model.)

*To all whom it may concern:*

Be it known that we, MATTHEW GRISWOLD and OREN R. HANCHETT, both citizens of the United States, and residents of Erie, county of Erie, and State of Pennsylvania, have invented a new and useful Improvement in Stove-Pipe Dampers, of which the following is a full, clear, and exact description, reference being had to the accompanying drawings, making part of this specification.

Our invention relates to the means for attaching the wooden block or handle to the damper rod or spindle, whereby the labor and expense of making such connection are diminished; and it consists in providing the spindle with a sleeve or collar having a bifurcated end or arms adapted to stride and be clamped around the wooden block or spindle-handle; also in providing the end of the spindle with a rib or spur engaging a groove in the block or handle, and which when the handle is clamped to the spindle by the forked collar referred to takes the strain from the latter and assists in holding the handle firmly engaged to the spindle.

In the accompanying drawings, Figure 1 represents a section through a pipe with the damper in place therein, the latter being shown in plan or side elevation. Fig. 2 is a side elevation of the damper rod or spindle and its handle (the latter in section) removed from the damper, and Fig. 3 shows in detail the parts of the damper rod or spindle.

A indicates the pipe, and B the damper in place therein.

C is the damper rod or spindle, which may be rectangular or polygonal in form, engaging sockets of corresponding form, as shown in Fig. 1, and also as shown in Letters Patent No. 226,680, dated April 20, 1880, or it may be made round and provided with spurs or projections $c\ c$, as shown in Fig. 2, to engage notches in the spindle-sockets, as shown in Letters Patent No. 188,418, dated March 13, 1877, as the manner of engaging the damper with the spindle forms no part of the present invention.

D indicates a sleeve or collar, loose on the spindle, and which is held in frictional engagement with the pipe A, for holding the damper at any desired adjustment by means of a spring $d$, pressing at one end against a collar or annular rib $c'$ on the spindle, and at the other against the sleeve D, as shown.

E is a short sleeve of sufficient diameter to pass over the collar $c'$ and to fit snugly at its inner end on an enlargement $c^2$ of the spindle outside of collar $c'$, and at the end of the spindle, and $c^3$ is an annular rib or collar formed on the end of the enlargement $c^2$, for preventing the sleeve E from slipping off said end. The outer end of the sleeve E is enlarged and bifurcated or provided with arms $e\ e$, which extend outward over the collar $c^3$ to receive the handle or block F, of wood or other suitable non-conducting material, between them. The extreme end of the spindle C is provided with a rib or spur $c^4$, crossing said end and entering a transverse groove formed at $f$ in one side of the block or handle F. The sleeve E, which, with its arms $e\ e$, constitutes a species of yoke on the end of the spindle, is made from malleable iron and cast in the form shown and described, or it may be stamped from wrought sheet-iron or other suitable metal, and when applied to the spindle the block or handle is placed between the arms and engaged with the ribs $c^2$, the latter entering the groove $f$. The outer ends of the arms $e\ e$ are bent inward toward each other and are made to clamp the handle snugly between them, as shown in Fig. 2. The rib $c^4$ takes the torsional strain upon the handle in turning the damper and enables us to make the sleeve or yoke E of much lighter material than would otherwise be practicable, thereby reducing the cost of construction.

The advantages of the wooden handle, as applied to the damper, are too well understood to require explanation.

Having now described our invention, we claim as new—

The damper-spindle provided with the enlarged head or end to receive and retain the handle-sleeve and having the transverse rib on its end for engaging the grooved block or handle, in combination with the removable sleeve engaging said enlarged end of the spindle and having the malleable arms or fork for receiving and clamping the block to the spindle, substantially as described.

In testimony whereof we have hereunto set our hands this 25th day of January, A. D. 1889.

MATTHEW GRISWOLD.
OREN R. HANCHETT.

Witnesses:
JOS. BORDOLBER,
H. L. McWHORTER.